(12) United States Patent
Gavit et al.

(10) Patent No.: US 6,722,608 B1
(45) Date of Patent: Apr. 20, 2004

(54) POROUS AIR BEARINGS FOR TAPE TRANSPORTS AND METHOD OF FABRICATION THEREOF

(75) Inventors: Stephan E. Gavit, Littleton, CO (US); K. John Stahl, Littleton, CO (US)

(73) Assignee: Segway Systems, LLC, Littleton, CO (US)

( * ) Notice: Subject to any disclaimer, the term of this patent is extended or adjusted under 35 U.S.C. 154(b) by 0 days.

(21) Appl. No.: 10/111,728
(22) PCT Filed: Oct. 28, 1999
(86) PCT No.: PCT/US99/25421
§ 371 (c)(1), (2), (4) Date: Jul. 31, 2002
(87) PCT Pub. No.: WO01/31648
PCT Pub. Date: May 3, 2001

(51) Int. Cl.⁷ .................................. B65H 23/24
(52) U.S. Cl. ................... 242/615.12; 360/102
(58) Field of Search ............ 242/615.11, 615.12, 242/914; 360/102, 130.21

(56) References Cited

U.S. PATENT DOCUMENTS

| | | | |
|---|---|---|---|
| 3,087,664 A | * | 4/1963 | Streeter ................ 242/615.4 |
| 3,281,040 A | | 10/1966 | Grant |
| 3,620,430 A | * | 11/1971 | Baumann et al. ...... 242/615.12 |
| 3,840,894 A | | 10/1974 | Arseneault |
| 3,911,490 A | | 10/1975 | Kostin et al. |
| 3,961,369 A | | 6/1976 | Baumann et al. |
| 4,726,502 A | * | 2/1988 | Cryderman ............ 226/97.3 |
| 4,925,077 A | * | 5/1990 | Daane et al. .......... 242/615.12 |
| 5,155,639 A | | 10/1992 | Platter et al. |
| 5,224,641 A | * | 7/1993 | Spicer ................ 242/615.12 |
| 5,310,107 A | | 5/1994 | Todd et al. |
| 5,570,831 A | | 11/1996 | Takeda et al. |
| 5,777,823 A | | 7/1998 | Gavit |
| 6,443,389 B1 | * | 9/2002 | Palone ................ 242/615.12 |

FOREIGN PATENT DOCUMENTS

JP 61-237252 10/1986

OTHER PUBLICATIONS

IBM Technical Disclosure Bulletin, "Air Supported Complaint Tape Guide", vol. 17, #4, Sep. 1974, p. 966, P.J. Arseneault et al.

* cited by examiner

Primary Examiner—Kathy Matecki
Assistant Examiner—Evan Langdon
(74) Attorney, Agent, or Firm—Timothy J. Martin; Michael R. Henson; Rebecca A. Gegick

(57) ABSTRACT

An air bearing system for a tape transport (10) including air bearing (322) having portions (360 and 370) providing different flow rates of air to support the tape.

29 Claims, 6 Drawing Sheets

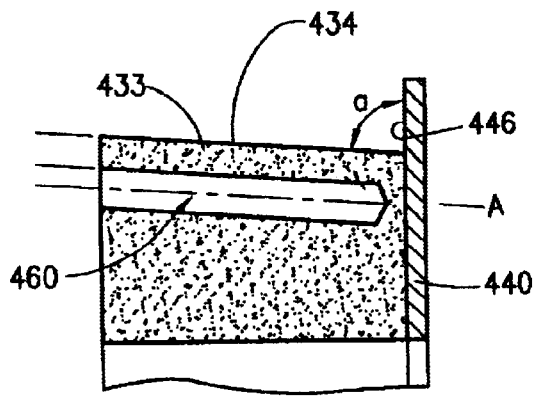
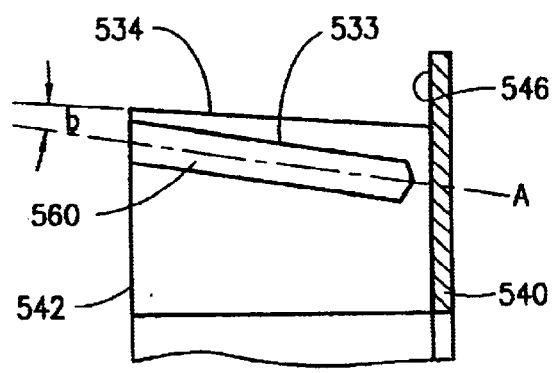
Fig.12a　　　　　　　　Fig.12b
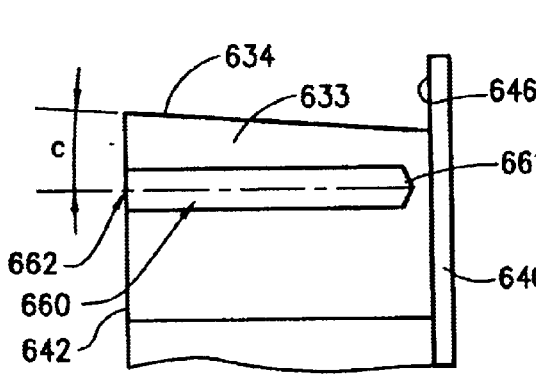
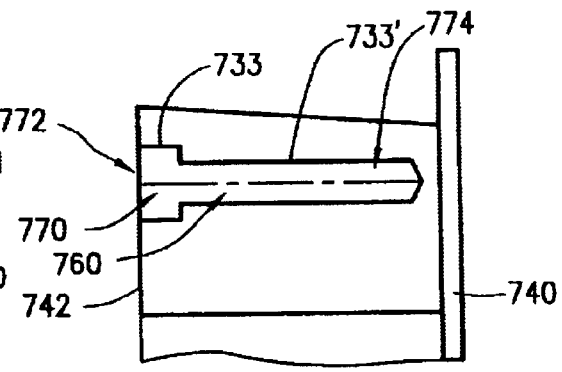
Fig.12c　　　　　　　　Fig.12d

POROUS AIR BEARINGS FOR TAPE TRANSPORTS AND METHOD OF FABRICATION THEREOF

FIELD OF THE INVENTION

The present invention is generally directed to tape transport apparatus of the type employed in the data storage industry. More particularly, however, the present invention is directed to air bearings used with such tape transport apparatus which are operative to support a tape on a cushion of air as it is transported through the apparatus, especially across a read/write transducer.

BACKGROUND OF THE INVENTION

The advent of the information age has seen an exponential growth in the accumulation and storage of data both for on-line usage as well as for archival purposes. In the early days of the computer, before the advent of magnetic disk and optical storage assemblies, data was typically stored on magnetic tapes, such as reel-to-reel tapes and later cassettes. In a magnetic tape storage device, a magnetic coil is used as a transducer to imprint data magnetically on a moving band of magnetic film; thereafter, when the film is advanced across the transducer, the data may be read and re-input into the processor. Magnetic tape has an advantage in that it is relatively low cost and can be erased and rewritten many times. In addition to the medium of magnetic tape, other tape storage media have been developed or are possible. For example, laser written optical tapes may be employed in an effort to increase the density of data stored on the medium.

Magnetic tape is still a highly desirable format for archiving data where the ability to rapidly access the data is of less significance and cost is of concern. The accessibility of data is a function of two variables, the density of storage and the speed at which the tape medium may be transported across and accurately read by the transducer. Here, also, it is important that a lateral edge of the tape be properly registered along a reference plane, called the datum, so that the data may be accurately interpreted.

In any event, where a tape medium is physically moved in a transport direction through a tape transport apparatus, it is necessary both to support the tape during transport and to hold a lateral edge thereof against the datum. Contact of the tape medium with the mechanical parts of the apparatus should be minimized, however, since physical contact between the tape and a mechanical part can cause abrasion of the tape surface or otherwise damage the tape. The elimination of contact is especially important where the tape is under a load at the place of contact. Such abrasions or damage can violate the integrity of the data stored thereon and can sometimes damage parts of the drive mechanism. Thus, it is common to employ a plurality of air bearings in order to support the tape in order to reduce or eliminate friction and contact.

A typical air bearing is in the form of a plenum chamber that has a polished metal bearing surface through which a plurality of ports are drilled. These ports, which are typically on the order of 0.006 to 0.020 inches in diameter, extend as a matrix over the bearing surface and communicate with the interior of the plenum. The plenum may be then pressurized with air which escapes through the ports thereby providing jets of air which form an air cushion to support the tape medium as it travels across the bearing surface. While this type of air bearing is functional, it is not without its disadvantages. First, the manufacture of such air bearings is quite expensive since each of the bearing surface ports is individually, drilled. Thus, for example, over a surface area of 1.5 to 3.0 square inches, it is not uncommon to drill 50 to 200 individual ports having this extremely small diameter. Not only is such drilling time consuming, the extremely small size of the drill bits lead to breakage of the bits. Accordingly, there is a relatively high scrap rate for the air bearings since a broken drill bit may become lodged in a port during the drilling process.

Even where a successful air bearing is formed of this type, it has a relatively limited openness since only approximately 0.1% of the surface is open due to the ports. Therefore, in order to provide sufficient air cushioning force, to resist the tension on the tape as it is transported, the plenum chambers must be maintained at a sufficient pressure, typically on the order of 1.0 to 12.0 psi. Due to compression of the air, heat is generated which heat must be dissipated; otherwise there is a risk of thermal damage to the tape.

In U.S. Pat. No. 5,777,823 issued Jul. 7, 1998 to Gavit, one of the inventors of the present invention, a tape transport apparatus is described. The transport in the '823 Patent uses an air bearing member which has at least a portion of which is fabricated out of a porous material that allows pressurized air to pass therethrough to produce a relatively uniform cushion of air on which a tape may ride. As described in the '823 Patent, the air bearing was formed as a housing having an air inlet adapted to be connected to an air source. The housing and the air bearing member are configured to form a plenum chamber having an interior in fluid communication with the air inlet. Alumina was described as the preferred construction of the porous material.

While the air bearing described in the '823 Patent constitutes a substantial improvement over drilled polished metal air bearings, the construction described therein had some fabrication disadvantages due to the need to seal the porous material at areas where air flow is not desired. Moreover, the mounting of the porous bearing in the metal housing creates some difficulties in mass production. Finally, like other air bearings of the drilled, polished metal type, this air bearing had undesirable variations in the wrap angle for a tape moving off of the portion of the air bearing remote from the recording head and onto a respective take-up or supply reel. This variable wrap angle was known to be a lesser problem for non-air bearing transportation systems utilizing small diameter rollers. These systems, though, have a substantial disadvantage in that the inertia of the rollers are a limiting factor in the rapid acceleration and deceleration of the tape medium; in addition, there is the likelihood of more contact between the tape and the transport rollers.

As noted above, it is also necessary that one lateral edge of the tape be held against the datum so that data may be accurately read or written by the transducer. In the past, this technique has been accomplished by the use of a plurality of spring fingers which carry, at their distal ends, lubricous buttons which bear against a second lateral side edge of the tape, opposite the first lateral edge which is to be held against the datum. While this technique of physically biasing the tape against the datum has been successful, it still leads to undesired contact of the tape medium as it is transported at high speeds across the air bearing. This can cause excessive friction, and the mechanical biasing of the tape can cause damage to the tape edge. Moreover, the tape edge can eventually create undesired grooving of the buttons. In the '823 Patent, the biasing of the lateral edge of the tape against the datum was alternatively accomplished by angling the bearing surface to the datum or by the conventional spring fingers.

Also, in air bearing systems, there are always two locations, i.e., at the opposite ends of the bearing surface, where the tape approaches and departs the bearing. At these locations, the flying height of the tape, that is, the separation distance between the tape and the bearing surface is less at the edges than at the fully wrapped region between the ends. In this fully wrapped region, the pressurized air can escape only at the tape edges. At the departure locations, pressurized air will escape as well. Since there is a loss of support from the air film at these locations as the positive pressure reduces to ambient, tape debris can often accumulate and possibly damage the recording medium. Such debris may also clog the pores of the traditional drilled air bearing. Such problems are exacerbated by the rapid advancement of the tape off of the bearing as the moving tape drags the air forming the cushion off of the bearing surface.

Accordingly, there remains a need for improved tape transport apparatus and, more particularly, for improved air bearings which can support a tape medium during rapid transport through such an apparatus. There is also a need for air bearings that eliminate the disadvantages attendant the individual drilling of ports through the bearing surface in order to provide air jets to form an air cushion that supports the tape. The present invention is directed to meeting these needs.

SUMMARY OF THE INVENTION

An object of the present invention is to provide a tape transport apparatus incorporating improved air bearings therefore which air bearings are constructed to provide an air cushion that supports a taped medium during transport.

Another object of the present invention is to provide an air bearing that reduces problems associated with variance of the wrap angle of the tape near the supply cartridge and near the take-up reel.

Still another object of the present invention is to provide porous air bearings that have better datum tracking capabilities.

A further object of the present invention is to provide a porous air bearing for tape transport systems that eliminates disadvantages of initial air build-up as well as departure tape sag.

It is yet another object of the present invention to provide a new and useful method of fabricating porous air bearings which method is simple and economical.

Still a further object of the present invention is to provide a method of manufacturing porous air bearings that provides a simplified sealing technique for surfaces through which air is not desired to pass.

According to the present invention, then, an air bearing system and a tape transport apparatus utilizing such air bearing system is provided. The air bearing system is adapted to support a tape on a cushion of air as the tape is transported in a transport direction thereacross. In its broad form, the air bearing system includes a air bearing member that has an air bearing surface with a first surface portion and a second surface portion. A source of pressurized air communicates with the air bearing member. The air bearing member is constructed such that air escapes through the first surface portion at a greater pressure than air that escapes through the second surface portion.

The air bearing system according to one embodiment of the invention includes a plenum associated with the air bearing member with this plenum being in communication with the source of pressurized air. The air bearing member then has a wall with one surface thereof in fluid communication with the plenum and an opposite surface thereof defining the air bearing surface. This wall is fabricated out of a porous material. A first portion of the wall underlying the first surface portion of the bearing member is thinner than a second portion of the wall underlying the second surface portion. Preferably the first surface portion is formed at a first radius of curvature and the second surface portion is formed at a second radius of curvature that is larger than the first radius of curvature. This results in an arcuate air bearing surface that has a dual radius of curvature. The first surface portion may extend for approximately 45 degrees of arc while the second surface portion can extend also for about 45 degrees of arc.

Alternatively, the air bearing member can include separate first and second plenums with the first plenum being associated with a first surface portion and a second plenum being associated with the second surface portion. The first and second plenums may be separated by a dividing wall of porous material so that a single source of pressurized air may be directly connected to the first plenum to supply air at the first pressure with the second plenum then being pressurized by air passing from the first plenum into the second plenum through the dividing wall. This dividing wall is fabricated of a porous material selected from a group consisting of ceramics, metals and composite materials. Alternatively, separate and distinct first and second plenums may be provided with the source of pressurized air including distinct first and second air supplies having different pressures so that one air supply is in fluid communication with the first plenum and a second air supply is in fluid communication with the second plenum.

The air bearings according to the invention may include a rib disposed at one or both ends of the air bearing surface. Such rib extends transversely across the air bearing surface and extends upwardly from the air bearing surface selected distance in order to resist flow of air across the rib as the tape moves thereover. These ribs may have an upper curved surface or a flat surface, with the latter being preferred. In either event, such ribs act as dams to prevent leakage and the drag off of air as the tape advances onto and off of the air bearing surface.

Moreover, the air bearings of the present invention include a datum face operative to define a guide surface for first lateral edge of the tape. The datum face is oriented in a datum plane that is parallel to the transport direction. Here, the air bearing surface is oriented at large acute angle with respect to the datum face with this angle being within a range of 70 degrees to just slightly less than 90 degrees, but preferably about 88.8 to 89.3 degrees.

The present invention also is directed to a tape transport apparatus that transports a tape in a tape drive in a reversible transport direction between a supply reel and a take up reel across a recording head. The tape transport apparatus includes a first air bearing member disposed on one transport side of the recording head and a second air bearing member disposed on another transport side of the recording head. Each of the first and second air bearing members then includes an air bearing surface having a first portion formed at a first radius of curvature located proximate to the respective supply and take up reels and a second surface portion formed at a second radius curvature located proximate to the recording head. The first radius of curvature is smaller then the second radius of curvature. Each of the air bearing members are constructed so that air will pass through the first and second surface portions to produce of cushion of air on which the tape may ride. A source of pressurized air is in communication with the first and second air bearing members with the first and second air bearing members constructed such that air escapes through the first surface portion at a greater pressure than air that escapes through the second surface portion.

These and other objects of the present invention will become more readily appreciated and understood from a consideration of the following detailed description of the exemplary embodiment of the present invention when taken together with the accompanying drawings, in which:

BRIEF DESCRIPTION OF THE DRAWINGS

FIG. 12(a) is a diagrammatic view in cross-section, showing the relative angle of the air bearing surface to the datum along with the drill angle of the air supply bores according to the present invention;

FIG. 12(b) is a cross-sectional view, similar to FIG. 12(a), showing a first alternative drilling of the air supply bore according to the present invention;

FIG. 12(c) is a cross-sectional view, similar to FIGS. 12(a) and 12(b), showing a second alternative arrangement of the air supply bores according to the present invention;

FIG. 12(d) is a cross-sectional view, similar to FIGS. 12(a)–12(c), showing an alternative configuration of the air supply bores according to the present invention;

DETAILED DESCRIPTION OF THE EXEMPLARY EMBODIMENTS

The present invention is broadly directed to a tape transport apparatus used in the data storage industry. This tape transport apparatus is operative to transport the tape medium in a transport direction across a read/write transducer in order to either place or access data on a medium, such as a magnetic tape. While the present invention is described specifically with respect to magnetic tape media, it should be understood that the principles described herein may be employed with other tape media without restriction. Moreover, while the term "read/write transducer" or "recording head" is used, the same may refer to a write transducer, a read transducer or a transducer that is able to perform both reading and writing functions.

The present invention is particularly directed, however, to an air bearing unit that is connectable to a pressurized air source in order to provide a cushion of air along the bearing surface so that the tape medium may be supported on the cushion of air as it moves in the transport direction. An important aspect of this air bearing is that it employs a dual radius so as to accommodate departure variance angle of the tape medium that occurs when a supply or take-up reel is either at an extreme "near empty" condition or an extreme "near full" condition.

Figure 1:
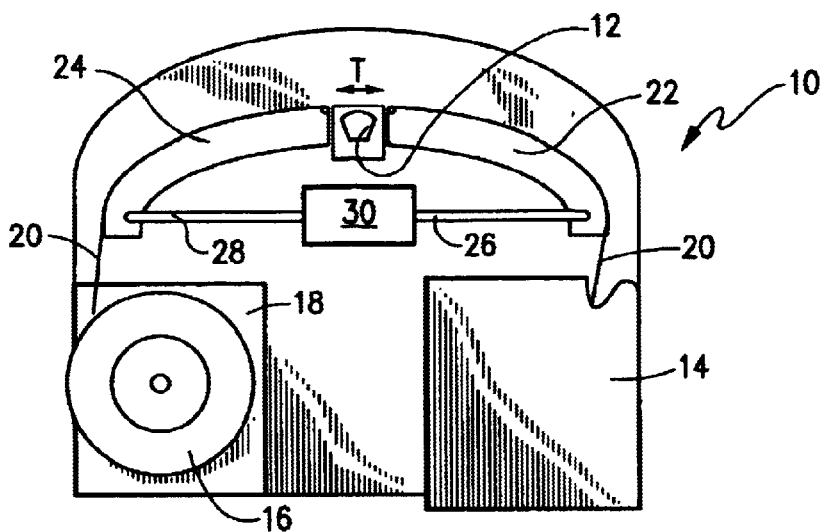
FIG. 1 is a simplified top plan view of a tape transport apparatus incorporating the improved air bearings of the present invention.

With reference, then, to FIG. 1, it may be see that a diagram of a representative tape transport apparatus 10 includes a read/write transducer 12, a cartridge supply reel 14, a take-up reel 16 and a motor drive 18. Motor 18 is operative to transport a tape 20 in a reversible tape drive direction "T". Tape 20 is supported from movement across transducer 12 by means of a pair of air bearings 22 and 24, described more thoroughly below. Pressurized air from air source 30 is supplied to air bearings 22 and 24, respectively, by conduits 26 and 28. Air source 30 can be of any type known in the art for providing pressurized air to the system.

Figure 3:
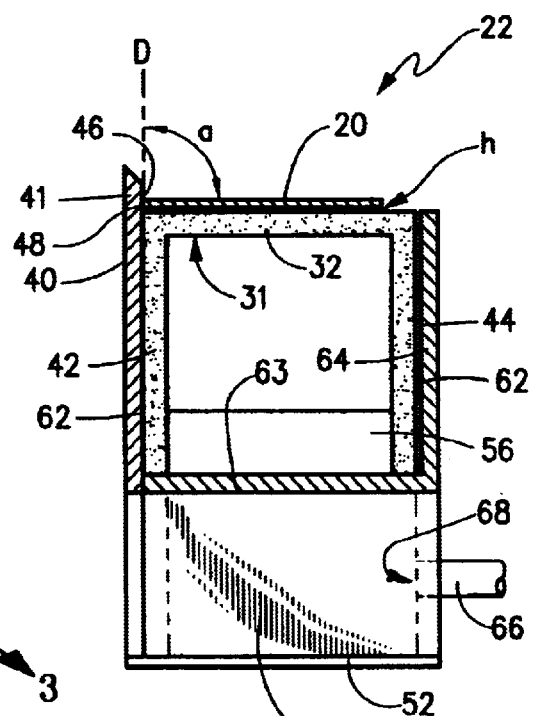
FIG. 3 is a cross-sectional view taken about lines 3—3 of FIG. 2.
Figure 2:
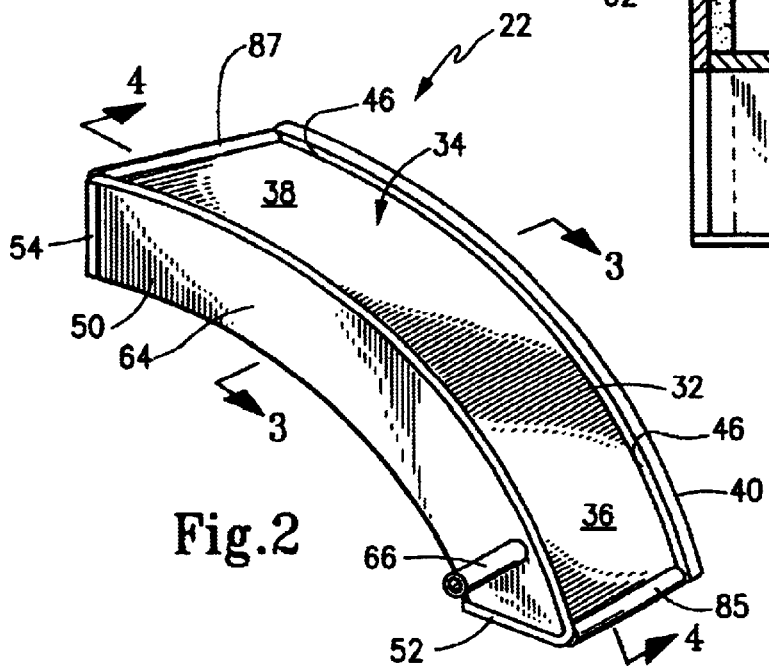
FIG. 2 is a perspective view showing an air bearing according to a first exemplary embodiment of the present invention.
Figure 4:
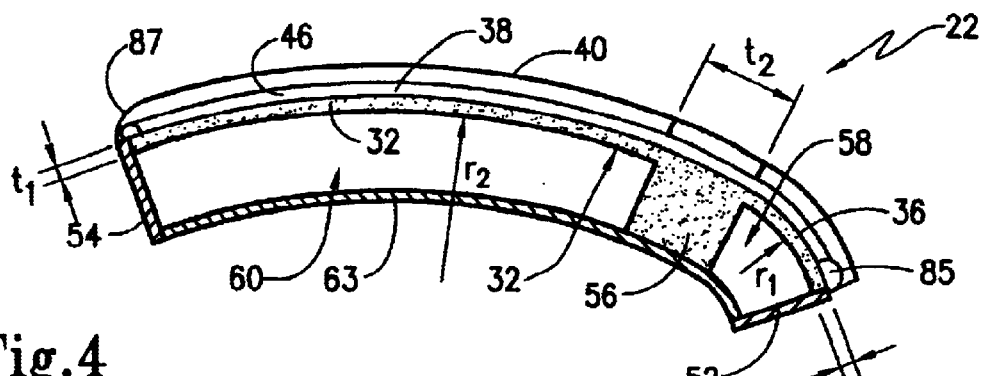
FIG. 4 is a cross-sectional view taken about lines 4—4 of FIG. 2.

A first representative air bearing 22 is shown in FIGS. 2–4. It should be understood that air bearing 24, in this first exemplary embodiment, is substantially a mirror image of air bearing 22, although it need not be such to implement the teachings of this invention. Thus, a description only of air bearing 22 is provided for simplicity. As is shown, then, in FIGS. 2–4, air bearing 22 includes an air bearing member in the form of a porous body 31 that has an upper wall 32 formed at a thickness "$t_1$" and provides an upper air bearing surface 34 that includes a first surface portion 36 and a second surface portion 38. Porous body 31 includes a pair of sidewalls 42 and 44 that each downwardly depend from upper wall 32 at approximately a right angle thereto. A datum plate 40 is mounted to wall 42 and provides a datum 41 that projects upwardly to have a datum face 46 against which a first lateral edge 48 of tape 20 is to be guided. Datum wall 46 is oriented in a datum plane "D".

Porous body 31 is constructed of of any suitable porous material including, for example, ceramics, metals and composites, so long as the material is sufficiently open to permit passage of air in a quantity and at a flow rate that is able to create the air cushion. It is preferred that the porous material be in the range of between 0.01 and 0.06 $in^3$/sec/ $in^2$/per PSI/in. This porous material may be sintered or non-sintered, depending upon its composition, and likewise may be impregnated with a selected adhesive to control porosity. Where metal is used, it should be non-magnetic if it is intended for use with magnetic tape media. The preferred porous material is an alumina silicate known as mullite such as that having a composition of three parts alumina to two parts silica. Datum plate 40 is preferably formed of a solid ceramic material, such as alumina.

An L-shaped support bracket 50 is secured to air bearing member 22. Bracket 50 has a lower plate portion 63 oriented along the lower edges of sidewalls 42 and 44 and a side plate portion 64 oriented alongside side wall 44. Lower plate portion 63 is arcuate in shape and extends generally parallel to air bearing surface 34. End plates 52 and 54 respectively seal the opposite ends of air bearing 22.

As is shown in FIG. 4, porous body 31 of air bearing 22 includes a barrier wall 56 which depends downwardly from upper wall 32 and which extends completely across between sidewalls 42 and 44. It should be understood that barrier wall 56 separates the interior of porous body 31 into a first plenum 58 and a second plenum 60. Moreover, it should be understood that upper wall 32, sidewalls 42 and 44 and barrier wall 56 are preferably integrally formed as a single piece of porous material. As noted above, this material allows pressurized air in plenum 58 and 60 to pass through upper wall 32 and out of bearing surface 34 in order to produce a cushion of air that supports tape 20 above air bearing surface 34 at a flying height "h" (FIG. 3). Typically, this flying height is desired to be on the order of 0.001–0.004 inches.

In order to seal sidewalls 42 and 44 against leakage of pressurized air, a suitable coating 62 is provided completely around the exterior of air bearing member 22 except along air bearing surface 34. This can be accomplished by entirely coating a molded air bearing member 22 with a suitable material, such as paint, epoxy or other suitable sealing film. Such film may be applied by techniques known in the art, for example, by a spray method or vacuum vapor deposition. This coating is then removed, either by self-suitable solvent or by machining along air bearing surface 34.

In order to introduce air into first and second plenums 58 and 60, side plate 64 of bracket 50 is mounted generally flush with sidewall 44 and, due to the presence of coating 62, it is not necessary to seal plate 64 against sidewall 44. Side plate 64 is provided with a nipple 66 that may be connected to a conduit, such as conduit 26, noted above, with this conduit communicating with the source of pressurized air 30. Nipple 66 also is in fluid communication with an opening 68 shown in phantom in FIG. 3, with opening 68 extending through sidewall 44 so that air can pass into plenum 58.

The purpose and function of barrier wall 56 can now be more fully appreciated. As was noted in the background of the invention, it is desirable to minimize the departure variance angle of tape 20 at the ends of each of bearings 22 and 24 that are proximate to the supply and take-up reels 14 and 16, respectively. That is, it is desired that the area of air bearings 22 and 24 located approximate to the supply and take-up reels be as small a radius of curvature as possible. Thus, air bearings 22 and 24 are provided with an air bearing surface 34 that has a first surface portion 36 formed at a relatively small radius of curvature "$r_1$" in the region proximate to the supply and take-up reels and with a second surface portion 38 formed at a larger radius of curvature "$r_2$" that terminates adjacent transducer 12. Thus, as is shown in FIG. 4, air bearing surface portion 36 is formed at a radius of curvature "$r_1$" that is approximately 0.5 inch (1.27 cm) with this curvature extending for approximately 45° of arc. Second air bearing surface portion 38 is formed at a radius of curvature of "$r_2$" that is approximately 2.0 inches (5.08 cm) and that also extends for approximately 45° of arc.

However, it should be understood that for a material of uniform porosity of uniform thickness, the flow characteristics of air through the material is described by the equation:

$$\phi = \rho \times \mu \times P \times A / t,$$

where $\phi$=mass flow rate (lbm/sec)

$\rho$=air density (lbm/in3)

$\mu$=bearing permeability (in4/lbf-sec)

P=applied plenum pressure (psi)

A=cross-sectional area through which air flows (in2) and t=material thickness (in), However, it is an object of the air bearing to float the tape at a constant or controlled distance, that is, "flying height", above the air bearing surface 34. The pressure which may be applied to float the tape is governed by the equation P=T/R where T is the tension per unit width of the tape and R is the radius of the wrap angle. Accordingly, where "$r_2$" is four times "$r_1$", it is necessary to pressurize first plenum 58 at four times the pressure of second plenum 60 in order to get a uniform fly height. This can be accomplished, naturally, by having separate pressure supplies for first and second plenums 58 and 60. However, it is also possible to accomplish the pressure differential by supplying from a single pressure source. For example, a single pressure source may be split into two pressure lines, with one pressure line supplying plenum 58 and the other pressure line supplying plenum 60. In such case, the pressure line supplying plenum 60 would be provided with a pressure reducing orifice so that the pressure in plenum 60 would be one-fourth the pressure in plenum 58.

The present invention, though, provides a more simplified procedure by supplying plenum 58 with pressurized air and separating plenum 58 from plenum 60 by porous barrier wall 56 that has a thickness "$t_2$". Where the thickness of upper wall 32 is "$t_1$" the thickness of "$t_2$" of barrier wall 56 should be $3t_1$. Thus, pressurized air passing through air bearing portion 36 is four times the pressure of air passing through second surface portion 38 since air passes only through a single thickness "$t_1$" associated with plenum 58 while air at the supplied pressure must pass through a thickness of "$3t_1$" plus "$t_1$" equals "$4t_1$" to pass through the wall portion at second surface portion 38. Accordingly, where "$r_1$" is one-fourth "$r_2$", the pressure balances to provide a relatively uniform air cushion with a smaller wrapping radius at plenum 58.

Figure 5:
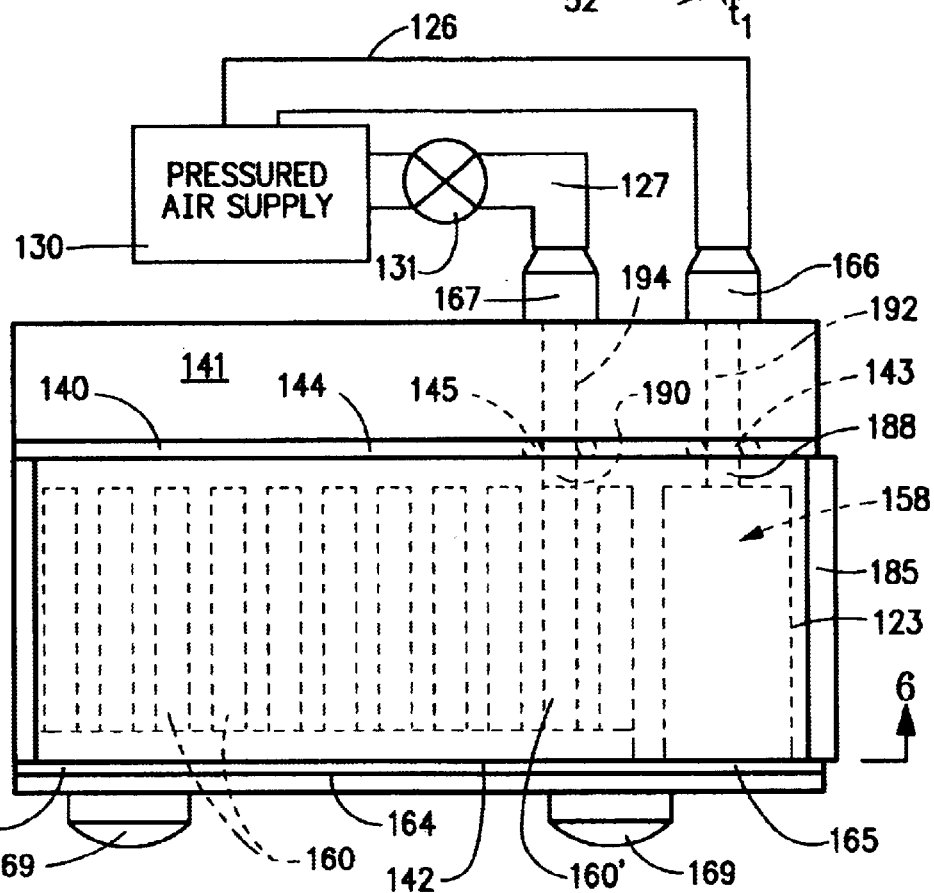
FIG. 5 is a front view in elevation showing a first alternate embodiment of an air bearing according to the present invention.
Figure 6:
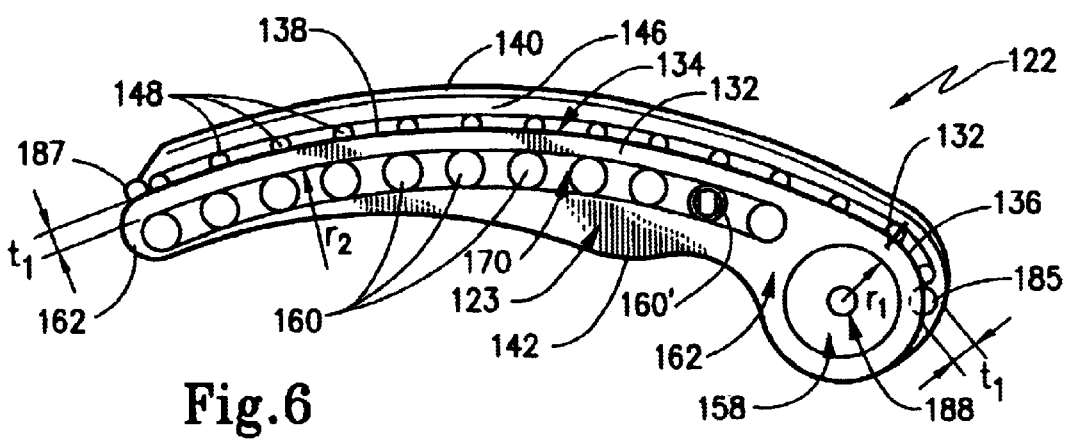
FIG. 6 is a cross-sectional view taken about lines 6—6 of FIG. 5.

With reference to FIGS. 5 and 6, a second exemplary embodiment of a dual plenum chamber is shown here with the plenums having air supplied at different pressures. In FIGS. 5 and 6, then, air bearing 122 is shown and is in the form of a solid body 123 of porous material, as described above, molded as a unitary piece having an air bearing surface 134. A datum plate 140 is disposed on the bottom side of air bearing 122 and sandwiched between a mounting plate 141 and body 123. Datum plate 140 is formed of a solid ceramic material, carbide or other magnetic or non-magnetic material. A top plate 164 is disposed on the top side of body 123 and is provided with a pair of nipples 166 and 167. Gasket 165 is sandwiched between top plate 164 and body 123. Bolts 169 secure the assembly together.

With reference to FIGS. 5 and 6, it may be seen that air bearing surface 134 is divided into a first surface portion 136 and second surface portion 138. Surface portion 136 is arcuate and formed along a radius of curvature "$r_1$" similar to that described in the embodiment shown in FIGS. 2–4. Likewise, second surface portion 138 is formed at a radius of curvature "$r_2$", which is four times larger than "$r_1$" and also that is similar to that described with respect to the embodiment described above. Air bearing 122 has an effective upper wall 132 formed generally at a constant thickness "$t_1$". This upper wall portion 132 is defined by a plurality of bores that are formed in body 123 of air bearing 122.

To this end, a first air supply bore 158 is drilled from top wall 142 generally parallel to first surface portion 136 and passes through body 123. A first supply port 188 penetrates bottom wall 144 and is in fluid communication with first air supply bore 158. Air supply bore 158 then defines a first plenum for air bearing 122. A plurality of second air supply bores 160 are drilled parallel to one another and to bore 158. As is shown in FIGS. 5 and 6, eleven such air supply bores 160 are drilled from top wall 142 almost completely through body 123; however, only bore 160' penetrates bottom wall 144 to provide a second supply port 190. The tangent to bores 160 and the tangent to bore 158 are equidistantly spaced from air bearing surface 134 so again it is necessary to supply bore 158 with pressure at four times the amount of pressure of air supply bores 160.

To this end, the mouths of air supply bores 160 at the top of the air bearing are in fluid communication with one another by a common manifold channel 170. Second air supply port 190 is in communication with passageway 194 formed through mounting plate 141 and an opening 145 in datum plate 140. Channel 170 is thus in fluid communication with nipple 167 by way of bore 160'. Nipple 166 of mounting plate 141 is in fluid communication with air supply bore 158 through passageway 192 in mounting plate 141 and opening 145 in datum plate 140.

A pressurized air supply 130 supplies pressured air directly through conduit 126 to nipple 166 and likewise supplies pressurized air through a four to one pressure reducing orifice 131 through conduit 127 to nipple 167. Thus, air supply bores 160 are at a pressure that is one-fourth the pressure of air supply bore 158. Since the wrap radius "$r_1$" is one-fourth of the wrap radius "$r_2$", a uniform cushion of air is provided for a tape moving over air bearing surface 134 due to the differential between the air pressure at air bearing surface portion 136 vis a' vis bearing surface portion 138.

The structure shown in FIGS. 5 and 6 provide advantages in manufacture. Here, the solid cast body portion 123 may be molded and hardened out of any suitable porous material as described above. This entire body portion may be dipped, sprayed or otherwise coated with a sealant material that prevents the passage of air therethrough. Bores 158, 160 and manifold channel 170 may be then formed in body member 123 which exposes the porous material. Air bearing surface 134 may be then formed by either a machining operation to remove the coating along air bearing surface 134 or by a suitable solvent to remove the coating. Accordingly, air bearing member 122 remains sealed by coating 162 at all regions except along manifold channel 170, the mouth of air supply bore 158 and air bearing surface 134.

Plate 164 may then be mounted, in any suitable manner in sealed relation to sidewall 142, such as by a gasket or by any other means. A datum plate 140 may then be mounted opposite plate 164 to provide a flat datum face 146. A plurality of strategically placed bleed holes 148 are formed through datum plate 140 with these openings being generally circular in cross-section. Bearing surface 134 diametrically intersects ports 146. This allows any excess air pressure to bleed away from air bearing surface 134 during use. In low pressure applications, bleed holes 148 may be eliminated due to the low air flow conditions.

Figure 7:
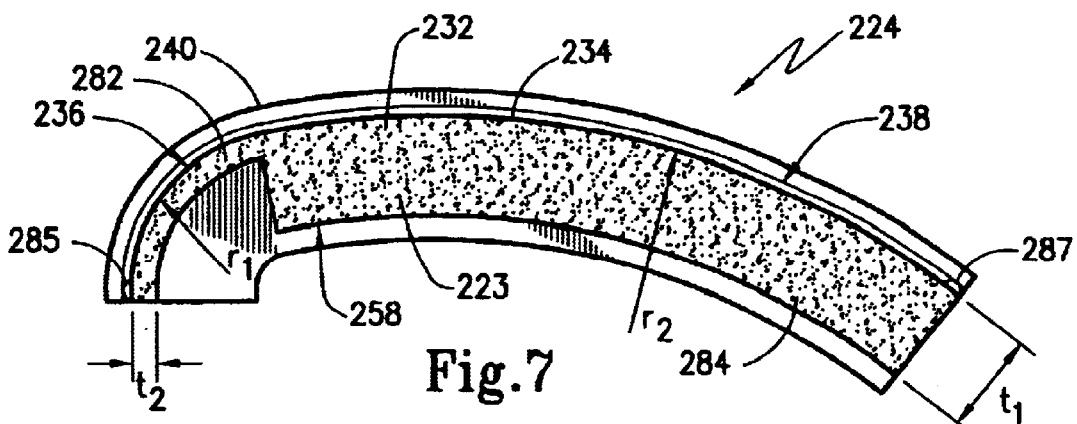
FIG. 7 is a cross-sectional view, similar to FIG. 4, showing a second exemplary embodiment of an air bearing unit according to the present invention.

A third exemplary embodiment of the present invention is shown in FIG. 7. FIG. 7 is a cross-sectional view similar to FIG. 4, but for an air bearing 224 that would correspond to air bearing 24 in FIG. 1. Here, air bearing 224 has a body portion 223 that provides an air bearing surface 234 divided into a first air bearing surface portion 236 and a second air bearing portion 238. A datum 240 is provided that is similar to datum 40, described above. In this embodiment, upper wall 232 is formed in two sections, 282 and 284 which correspond respectively to first surface portion 236 and second surface portion 238, respectively. Upper wall portion 282 has a thickness "$t_1$" while wall portion 284 has a thickness "$t_2$" that is four times the thickness of "$t_1$". A single plenum 258 is then provided so that pressurized air may pass from plenum 258 through upper wall 232. Due to the difference in thickness of wall 232, however, pressure is four times greater at first surface portion 236 then at second surface portion 238. However, since the wrapping radius of second surface portion 238 is four times the radius of second surface portion 236, a generally uniform flying height for a tape transported thereacross will result. In this embodiment, again, a suitable coating may be provided to seal the sides and ends of air bearing 224 and a suitable plate providing communication between a pressurized air source and plenum 258 may be employed.

The most preferred embodiment of the present invention, at the time of filing this application, is shown in FIGS. 8–11. In this embodiment, air bearing member 322 is formed by a porous member 323 that is coated in the manner described with respect to the embodiment shown in FIGS. 5 and 6. Here, porous member 323 has an air bearing surface 334 having a first surface portion 336 formed at a small radius of curvature "$r_1$" and a second air bearing surface portion 338 formed at a larger radius "$r_2$". A plurality of air supply bores 358 and 360 are respectively associated with air bearing surface portions 336 and 338. To this end, air supply bores 360 are located at a distance "$t_2$" that is four times further away from surface portion 338 than the distance of separation "$t_1$" between surface portion 336 and air supply bores 358. Due to this difference in spacing, bores 358 and 360 may be connected by a common manifold channel 370 and supplied at a common air pressure. It should now be understood that wall portion 333 will pass four times the amount of air per unit area as wall portion 335. However, due to the wrap radii, tape 20 will float on a cushion of air that is generally uniform across air bearing surface 334.

In assembly, the porous member 323 of air bearing member 322 and datum plate 340 are mounted between a top mounting plate 364 and a bottom mounting plate 365 means of bolts 369. It should be understood that bottom mounting plate 365 could be part of the structure or housing of the tape transport apparatus instead of a separate piece attached to that structure. In any event, an air supply nipple 366 is provided that communicates through a bore 368 in plate 365, for example, so that air may flow through nipple 366, through bore 368, through an air supply bore 360' and into manifold channel 370. Datum plate 340 is provided with bleed holes 348 in a manner similar in purpose and function as bleed holes 148.

To this end, air supply bore 360' is drilled completely through porous member 323 in a manner similar to that described with respect to air supply bore 160' depicted in FIG. 5. Of course, it should be appreciated that any of air supply bores 358, 360 could be employed for this purpose of communicating with the pressurized air supply with the remaining air supply bores drilled a majority of the distance through top wall 325 and porous member 323 without penetrating bottom wall 327 thereof.

In order that air can pass through datum plate 340, an opening 341 is provided; this opening is sealed in assembly by an O-ring 390 that seats against wall 327 of porous member 323 and bottom plate 365. A gasket 380 is used to seal manifold channel 370, and this gasket 380 is sandwiched between top mounting plate 364 and porous member 323. Bolts 369 then extend through openings 391–394 formed respectively in top mounting plate 364, gasket 380, porous member 323 and datum plate 340. The threaded ends of bolts 369 are secured in threaded opening 395 formed in bottom plate 365.

Figure 9:
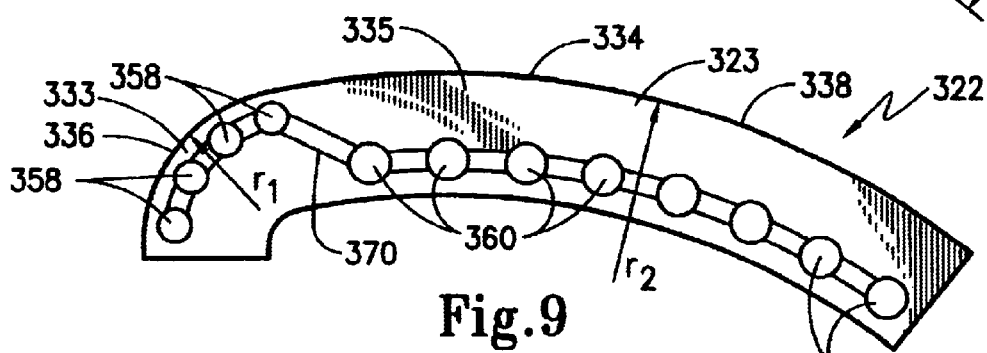
FIG. 9 is a top plan view showing the porous air bearing body according to the third alternative embodiment of the present invention shown in FIG. 8.
Figure 10:
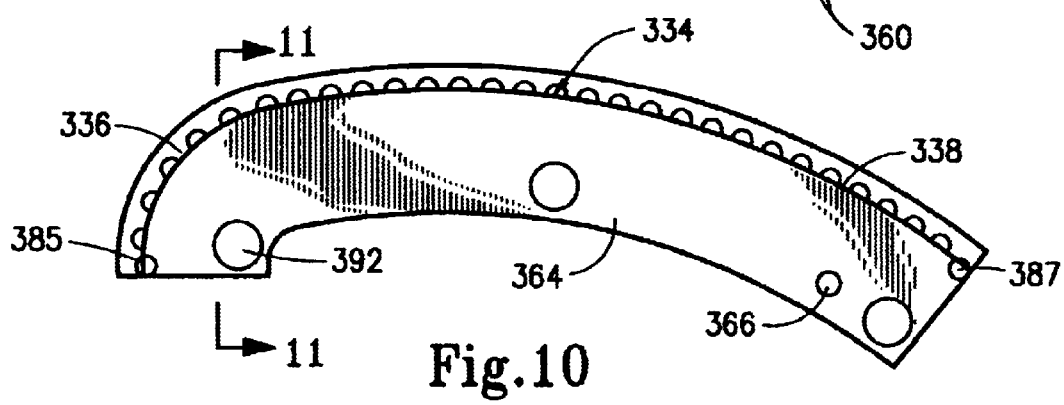
FIG. 10 is a top plan view, similar to FIG. 9, showing the assembled air bearing unit of FIG. 8.
Figure 11:
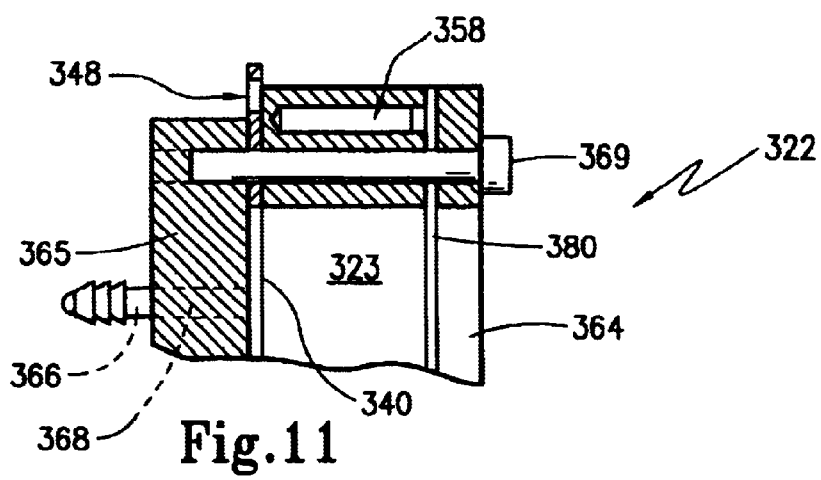
FIG. 11 is a cross-sectional view taken about lines 11—11 of FIG. 10.
Figure 8:
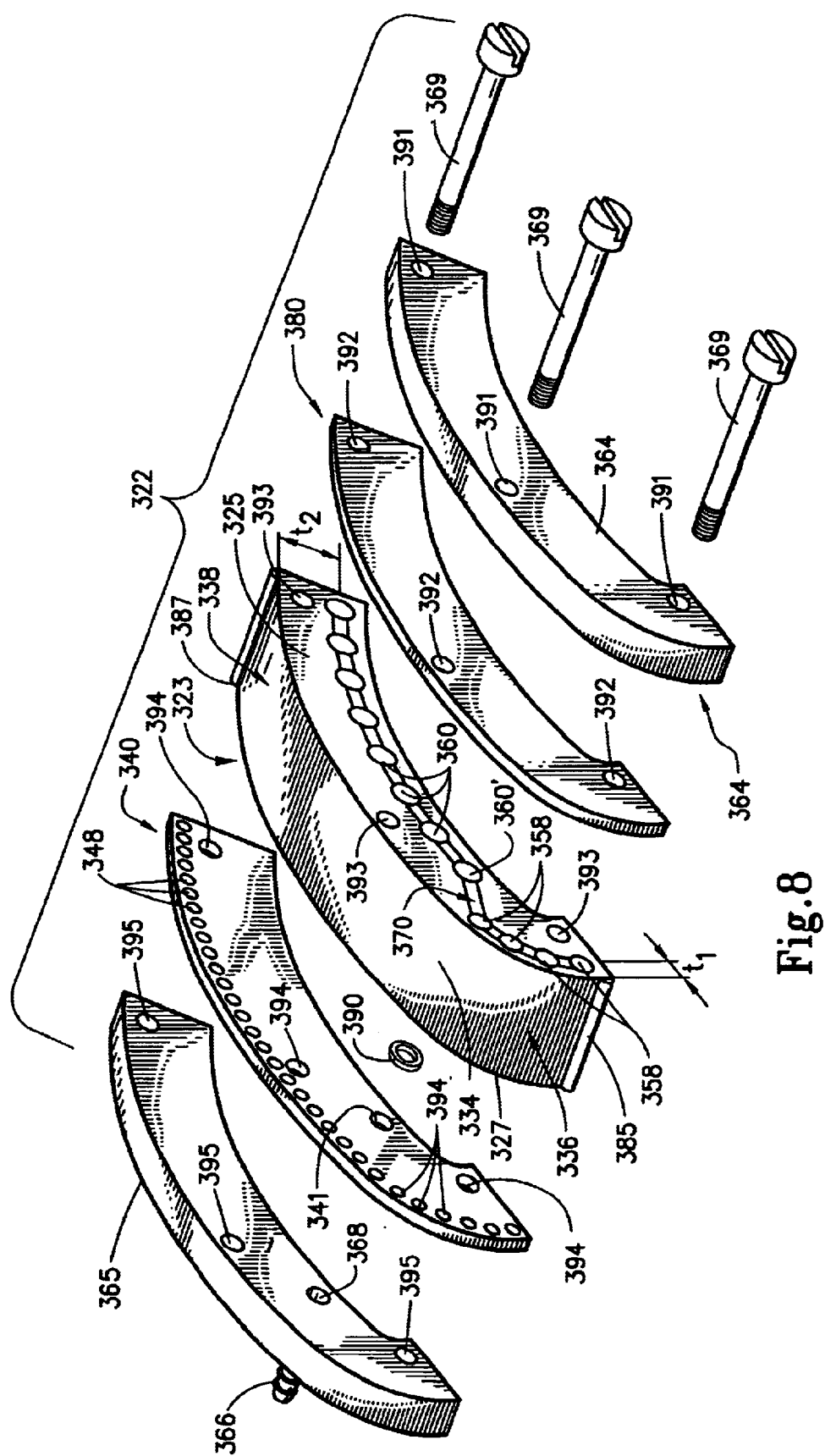
FIG. 8 is an exploded perspective view of the air bearing unit according to a third exemplary embodiment of an air bearing according to the present invention.

FIGS. 12(a) through 12(d) show four possible alternatives, in diagrammatic form, for drilling the air supply bores for the embodiment shown in FIGS. 8–10 as well as the embodiment shown in FIGS. 5 and 6. For example, in FIG. 12(a), a representative air supply bore 460 is drilled along axis "A" that is parallel to air bearing surface 434. Air bearing surface 434 in turn, is formed at a large acute angle "a" with respect to datum face 446 of datum plate 440. Axis "A" is parallel to surface 434 so that air will uniformly flow through wall portion 433.

In FIG. 12(b), axis "A" of air supply bore 560 is canted at a small acute angle "b" with respect to air bearing surface 534. Thus, there is a differential in the flow of air through wall 533 at a location proximate to datum face 546 of datum plate 540 and sidewall 542. The reverse is true for the embodiment shown in FIG. 12(c). Here, air supply bore 660 has an axis "A" that is oriented at an acute angle "c" with respect to bearing surface 634, but here, the angle is chosen so that the mouth of air supply bore 660 is further away from air bearing surface 634 then and is terminal mount 662. Again, wall portion 633 is non-uniform between datum plate 640 and side 642 so that greater air flow occurs at a location proximate to datum face 646 than at the outer sidewall 642.

In FIG. 12(d), the air supply bore 760 is formed to have a different configuration than as described above. Here, air supply bore 760 has a first region 770 proximal to mouth 772 that is counterbored to have a larger diameter that second region 774 that is distal to mouth 772. By counterboring region 770 to a larger diameter, the thickness of wall portion 733 that is proximal side 742 is thinner than the thickness of wall portion 733' that is proximal datum 740. Therefore, a greater air pressure will occur at the edge of the tape remote from datum 740. It should be expressly understood that an air supply bore could have several counterbore diameters of decreasing dimension from the top to the bottom so as to have more than two distinct regions. Furthermore, a conic air supply bore could be provided by drilling such bore with a conic bit. This would result in an air supply bore that continuously diminishes in diameter instead of having a stair-step reduction in diameter such as that show in FIG. 12(d).

Figure 13A:
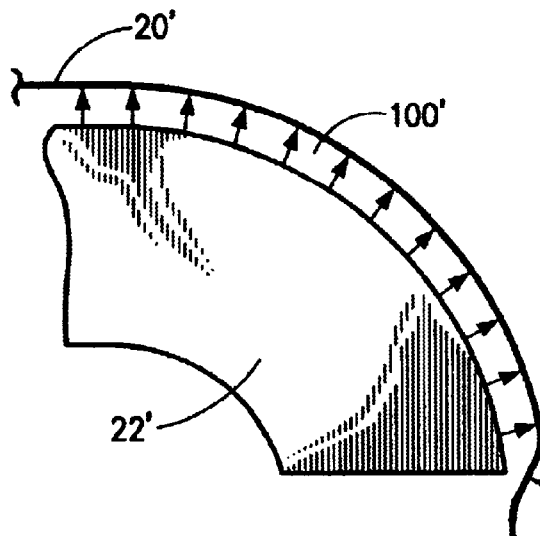
FIG. 13(a) is a diagrammatic view showing the tape sag at a departure location from an air bearing according to the prior arts.

An additional feature of the present invention is the use of transverse out rigger ribs at each terminal end of the respective air bearings. To understand these out rigger ribs, reference is first made to FIGS. 13(a) and 13(b). With reference to FIG. 13(a), it may be seen that representative tape 20' is trained over an air bearing 22' so that an air cushion 100' is present. However, air can spill out of or off of air bearing 22' in the region "S" due to the transition from the pressure of air cushion 100 to ambient pressure.

Figure 13B:
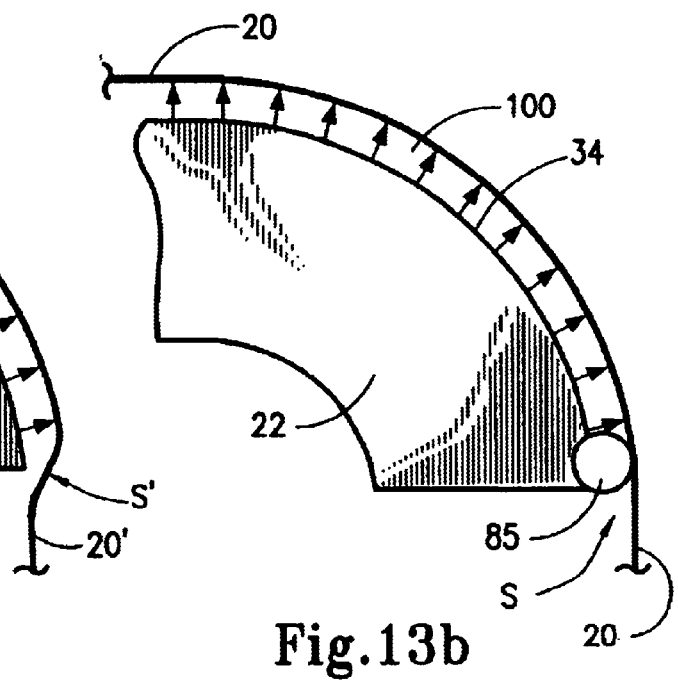
FIG. 13(b) is a diagrammatic view showing the outrigger rib according to the present invention.

In order to eliminate this air spill, a transverse rib member or "outrigger" 85 is provided to extend across air bearing surface 34 as shown in FIG. 13(b). Transverse rib element 85 acts as an air dam so that air may not readily spill from region "S". However since tape 20 is located at a tangent to outrigger rib element 85, there is essentially no loading on tape 20 that might damage tape 20 as it passes over outrigger element 85.

Figure 13C:
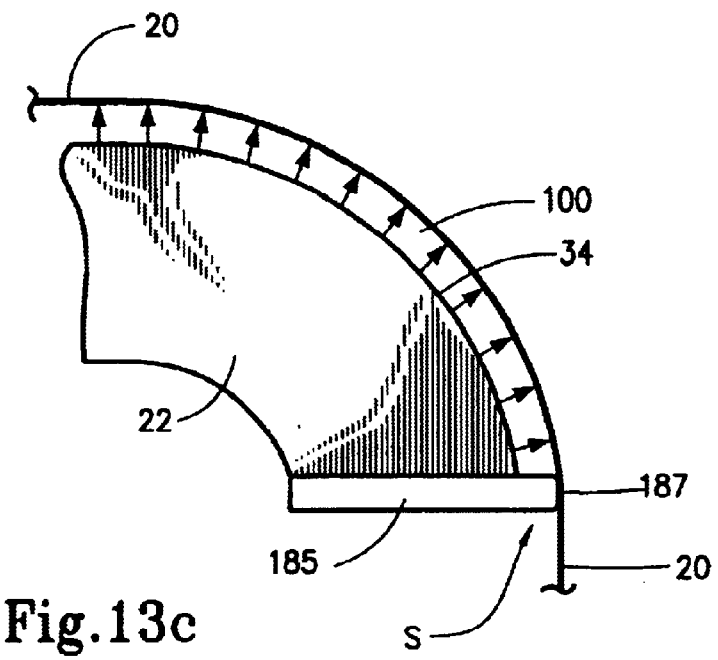
FIG. 13(c) is a diagrammatic view showing an alternative outrigger rib according to the present invention.

Outrigger elements 85 may be formed to have an upper curved surface 87, as is shown in FIG. 13(b). Alternatively, as is shown in FIG. 13(c), outrigger 185 can have a planar upper surface 187. Indeed, the planar upper surface it is currently preferred. In either case, it is preferred that the surface of the outrigger elements protrude above the air bearing surface a selected distance, depending on the air pressures used, the width of the transported tape and the fly height desired for the tape. For wider tapes, the projection of the outrigger element is generally less than for narrower tapes. In any event, it is contemplated that the protrusion of the outrigger elements be in a range of 0.001–0.004 inches.

Turning again to the embodiments described above, it may be seen in FIGS. 1 and 2 that air bearings 22 and 24 are provided at their opposite extreme ends with transverse outrigger elements 85 and 87. Likewise, the embodiment in FIGS. 5 and 6 are provided with transverse outrigger elements 185 and 187. In the embodiment shown in FIG. 7, transverse outrigger elements 285 and 287 are provided for air bearing 224. Finally, outrigger elements 385 and 387 are provided for the embodiments shown in FIGS. 8–11.

In all cases, the transverse outrigger elements extends across the respective air bearing surface, but it should be understood that by using the word "transverse" it is not intended that the outrigger elements be necessarily perpendicular to the respective datum face. Rather, the outrigger elements could be oriented obliquely, although it is contemplated that, in the preferred embodiment, they be parallel to the air bearing surface. In any event, the outrigger elements are constructed of a suitable material such as solid alumina.

The embodiments of the air bearing elements according to the present invention may be made according to a simple manufacturing methodology. Here, the manufacturing methodology includes a first step of forming a porous body to a selected shape. The preferred material for forming this body, as noted above, is an alumina silicate such as that known as mullite. Alternatively, the porous material may be any suitable ceramic, metal or composite materials and may be impregnated with a selected adhesive to control porosity. The manufacturing methodology contemplates that the porous air bearing body is formed to have a dual radius surface with each portion of the dual radius surface comprising approximately 45 degrees of arc. In any event, it is contemplated that the porous air bearing body is cast, extruded, molded or otherwise fabricated in a manner known in the art.

After the porous body is formed into the desired shape, a coating is applied to all exterior surfaces of that body. This coating may be any suitable paint, epoxy or other material that is sufficient to seal the porosity of the body completely therearound. Next, the manufacturing methodology includes the step of exposing the air bearing surface by removing the coating therefrom. This can be accomplished by machining away the coating layer on the air bearing surface or using a solvent to dissolve the coating material therefrom.

In any event, the manufacturing methodology also contemplates the formation of plenums in the porous body. This can be accomplished during the formation step of the porous body. Here, any portion of the coating in the interior of the plenums that is opposite the air bearing surface must be removed. Preferably, however, the plenums are formed by drilling holes at desired locations within the porous body. This creates air supply bores so that air may be introduced into the interior of the porous body at a pressure sufficient so that air flows through the porous body and out of the air bearing surface. Here, it should be understood that the drilled holes be created such that a differential air flow occurs for the air bearing surface that is proportionate to the radius curvature of the two sections thereof so that a relatively uniform air cushion will be created when a tape is moved across the air bearing surface.

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiment of the present invention without departing from the inventive concepts contained herein.

We claim:

1. An air bearing system adapted for use on a tape transport apparatus to support a tape on a cushion of air as said tape is transported in a transport direction thereacross, comprising:
   (a) an air bearing member including an air bearing surface having a first surface portion and a second surface portion spaced from one another in the transport direction; and
   (b) a source of pressurized air communicating with said air bearing member, said air bearing member constructed such that air escapes through the first surface portion is at a greater flow rate than air that escapes from the second surface portion.

2. An air bearing system adapted for use on a tape transport apparatus to support a tape on a cushion of air as said tape is transported in a transport direction thereacross, comprising:
   (a) an air bearing member including an air bearing surface having a first surface portion and a second surface portion and including a first plenum associated with the first surface portion and a second plenum associated with the second surface portion, said air bearing member constructed such that air at a first pressure in the first plenum will pass therethrough and out of the first surface portion and air at a second pressure in the second plenum will pass therethrough and out of the second surface portion; and
   (b) a source of pressurized air communicating with the first and second plenums such that the first pressure is greater than said second pressure whereby air will flow through said air bearing member and out of the air bearing surface to create an air cushion to support a tape transported thereacross with there being a differential in the air cushion along the first and second surface portions, respectively.

3. An air bearing system according to claim 2 wherein the air bearing surface is arcuate in configuration.

4. An air bearing system according to claim 3 wherein the first surface portion is formed at a first radius of curvature and wherein the second surface portion is formed at a second radius of curvature different from the first radius of curvature.

5. An air bearing system according to claim 4 wherein the first radius of curvature is smaller that the second radius of curvature.

6. An air bearing system according to claim 3 wherein the first surface portion extends for about forty-five degrees of arc and where the second surface portion extends for about forty-five degrees of arc.

7. An air bearing system according to claim 2 wherein said air bearing member is fabricated out of a porous material.

8. An air bearing system according to claim 7 wherein said porous material is selected from a group consisting of ceramics, metals, and composite materials.

9. An air bearing system according to claim 8 wherein said porous material is an alumina silicate.

10. An air bearing system according to claim 2 wherein the first and second plenums are separated by a dividing wall of porous material, said source of pressurized air being directly connected to the first plenum to supply air at the first pressure and with the second plenum being pressurized by air passing through the dividing wall.

11. An air bearing system according to claim 10 wherein said dividing wall is fabricated from a porous material selected from a group consisting of ceramics, metals, and composite materials.

12. An air bearing system according to claim 2 wherein said source of pressurized air includes distinct first and second air supplies having different pressures, said first air supply being in fluid communication with the first plenum and said second air supply being in fluid communication with the second plenum.

13. An air bearing system according to claim 2 wherein said bearing member includes a datum face operative to define a guide surface for a first lateral edge of said tape, said datum face oriented in a datum plane that is parallel to the transport direction.

14. An air bearing system according to claim 13 wherein the air bearing surface is oriented at a large acute angle with respect to the datum face.

15. An air bearing system according to claim 14 wherein said large acute angle is within a range of seventy degrees to about ninety degrees.

16. An air bearing system according to claim 2 including a rib disposed at one end of said air bearing surface and extending transversely thereacross, said rib extending upwardly from the bearing surface and operative to resist flow of air thereacross as the tape moves thereover.

17. An air bearing system according to claim 16 wherein there is a rib at each end of said air bearing surface and extending transversely thereacross.

18. An air bearing system according to claim 16 wherein said rib extends upwardly from the bearing surface a height of between 0.001 to 0.004 inch (0.026 to 1.02 mm).

19. A tape transport apparatus to support a tape as said tape is transported by a tape drive in a reversible transport direction between a supply reel and a take-up reel across a recording head, comprising:
   (a) a first air bearing member disposed on one transport side of said recording head and a second air bearing member disposed on another transport side of said recording head, each of said first and second air bearing members including an air bearing surface having a first surface portion formed at a first radius of curvature and located proximate to the respective supply and take-up reel and a second surface portion formed at a second radius of curvature and located proximate to the recording head, the first radius of curvature being smaller than the second radius of curvature, each said air bearing member constructed such that air will pass through the first and second surface portions to produce a cushion of air on which the tape may ride; and
   (b) a source of pressurized air communicating with the first and second air bearing members, said first and second air bearing members constructed such that air escapes through the first surface portion is at a greater flow rate than air that escapes from the second surface portion.

20. An air bearing system according to claim 19 including a plenum associated with said air bearing member and in fluid communication with said source of pressurized air, and wherein said air bearing member has a wall with one surface thereof in fluid communication with said plenum and with an opposite surface thereof defining the air bearing surface, said wall being fabricated out of a porous material, a first portion of said wall underlying the first surface portion being thinner than a second portion of said wall underlying the second surface portion.

21. An air bearing system according to claim 20 wherein the first surface portion is formed at a first radius of curvature and wherein the second surface portion is formed at a second radius of curvature larger than the first radius of curvature.

22. An air bearing system according to claim 19 including a rib disposed at one end of said air bearing surface and extending transversely thereacross, said rib extending upwardly from the bearing surface and operative to resist flow of air thereacross as the tape moves thereover.

23. An air bearing system according to claim 22 wherein there is a rib at each end of said air bearing surface and extending transversely thereacross.

24. An air bearing system according to claim 22 wherein said rib extends upwardly from the bearing surface a height of between 0.001 to 0.004 inch (0.026 to 1.02 mm).

25. An air bearing system adapted for use on a tape transport apparatus to support a tape on a cushion of air as said tape is transported in a transport direction thereacross, comprising:
   (a) an air bearing member including an air bearing surface having a first surface portion and a second surface portion;
   (b) a source of pressurized air communicating with said air bearing member, said air bearing member constructed such that air escapes through the first surface portion is at a greater flow rate than air that escapes from the second surface portion; and
   (c) a plenum associated with said air bearing member and in fluid communication with said source of pressurized air, and wherein said air bearing member has a wall with one surface thereof in fluid communication with said plenum and with an opposite surface thereof defining the air bearing surface, said wall being fabricated out of a porous material, a first portion of said wall underlying the first surface portion being thinner than a second portion of said wall underlying the second surface portion.

26. An air bearing system adapted for use on a tape transport apparatus to support a tape on a cushion of air as said tape is transported in a transport direction thereacross, comprising:
   (a) an air bearing member including an air bearing surface having a first surface portion and a second surface portion and including a rib disposed at one end of said air bearing surface and extending transversely thereacross, said rib extending upwardly from the bearing surface and operative to resist flow of air thereacross as the tape moves thereover; and
   (b) a source of pressurized air communicating with said air bearing member, said air bearing member constructed such that air escapes through the first surface portion is at a greater flow rate than air that escapes from the second surface portion.

27. An air bearing system according to claim 25 wherein the first surface portion is formed at a first radius of curvature and wherein the second surface portion is formed at a second radius of curvature larger than the first radius of curvature.

28. An air bearing system according to claim 26 wherein there is a rib at each end of said air bearing surface and extending transversely thereacross.

29. An air bearing system according to claim 26 wherein said rib extends upwardly from the bearing surface a height of between 0.001 to 0.004 inch (0.026 to 1.02 mm).

* * * * *

UNITED STATES PATENT AND TRADEMARK OFFICE
CERTIFICATE OF CORRECTION

PATENT NO. : 6,722,608 B1
DATED : April 20, 2004
INVENTOR(S) : Stephan E. Gavit et al.

It is certified that error appears in the above-identified patent and that said Letters Patent is hereby corrected as shown below:

Column 14,
Lines 56 and 66, "An air bearing system" should read -- A tape transport apparatus --;

Column 15,
Lines 4, 9 and 12, "An air bearing system" should read -- A tape transport apparatus --.

Signed and Sealed this

Seventeenth Day of August, 2004

JON W. DUDAS
*Acting Director of the United States Patent and Trademark Office*